INVENTOR
H. SUHL
BY Harry C. Hart
ATTORNEY

INVENTOR
H. SUHL
BY Harry C. Hart
ATTORNEY

INVENTOR
H. SUHL
BY Harry C. Hart
ATTORNEY

INVENTOR
H. SUHL
BY Harry C. Hart
ATTORNEY

INVENTOR
H. SUHL
BY Harry C. Hart
ATTORNEY

United States Patent Office 3,066,263

Patented Nov. 27, 1962

3,066,263

GYROMAGNETIC PARAMETRIC AMPLIFIER

Harry Suhl, Irvington, N.J., assignor to Bell Telephone Laboratories, Incorporated, New York, N.Y., a corporation of New York Filed Feb. 15, 1957, Ser. No. 640,464
5 Claims. (Cl. 330—56)

This invention relates to signal amplification. Its principal object is to amplify signals of very high, or so-called microwave, frequencies, especially those of very low amplitudes. A subsidiary object is to furnish such amplification with minimal noise degradation. These objects are attained by the utilization of unfamiliar modulation principles.

It has long been known and appreciated that intermodulation of a given wave (usually denoted the signal wave) with a wave of much higher frequency (usually denoted the carrier wave) in a magnetic modulator device, results in the production of combination products similar to those resulting from other types of modulation. In this connection, the term "magnetic modulator device" denotes an inductance element having a ferromagnetic core and therefore exhibiting a nonlinear relation between its magnetizing force on the one hand and its flux or inductance on the other. As with other types of modulation, the frequency of the first order upper modulation product is the sum of the carrier frequency and the signal frequency, while that of the first order lower modulation product is the difference between these frequencies. Similarly, the frequency of each higher order modulation product is likewise the sum or the difference of two terms, one of which may be twice the carrier frequency, twice the signal frequency, three times the one or the other, and so on.

Under proper conditions a particular one, at least, of these combination products may attain a greater energy content that that of the original signal wave which takes part in its production. This principle has been commonly utilized in the past for the eventual amplification of a signal wave, the operation, beyond the step of generating a modulation product of improved energy content, comprising a further step of demodulation or rectification whereby the original impressed signal wave is reproduced in amplified form.

It is also known, though far less widely, that the flow of current and the consequent absorption of power at the lower side frequency are accompanied by the presentation of negative resistance to the signal source, while the flow of upper side frequency current, to the contrary, results in the presentation of increased positive resistance to the signal source. This lower side frequency power or current is preferably caused to flow locally in a circuit tuned to the lower side frequency and provided for the purpose. When sufficient lower side frequency current flows (and when the operation in this fashion is not defeated by permitting the flow of upper side frequency current which might overpower or outweigh the effects of the lower side frequency current), the negative resistance which is thus produced and presented to the signal wave source may be significant and, indeed, substantial; so that the apparatus as a whole delivers more power to the signal frequency circuit than it receives. The ultimate source from which this additional power is derived is, of course, the carrier wave source.

The mechanism that is responsible for the generation of this negative resistance is now understood to be as follows: By virtue of the nonlinear element the signal, of frequency $f_1$, "beats" with the carrier, of frequency $f_c$, to produce, among other modulation products, an electromotive force of the lower side frequency $f_2=f_c-f_1$. A circuit being provided for the purpose, a large current flows at this frequency, and this current, in turn, beats with that of the carrier frequency, to produce an electromotive force of the original signal frequency. The resulting generated signal frequency current may exceed the causative signal frequency current; in which case regeneration results.

The magnitude of the negative resistance thus produced depends on the impedances of the various branches of the circuit, and on the power levels at which the signal wave and the carrier wave are supplied to it. If, due to a perturbation in any one of the controlling factors it should exceed the net positive resistance of the signal frequency circuit, the latter would break into self-oscillation, and controlled signal-frequency gain would then be out of the question. Hence such a system must, for useful operation, be maintained below the threshold of instability, and by a safe margin. Possibly for this reason, negative resistance amplifiers embodying this principle have not gone into wide use, since, at low or moderate frequencies, such a unit compares unfavorably with amplifiers whose operation is based on different principles and which are capable of handling signal powers over wide ranges without presenting any stability problems, and without raising serious noise problems.

The principles of magnetic modulation with frequency conversion can be, and have been, instrumented at high frequencies by the employment of structures appropriate to such frequencies and a body of a suitable ferrite material, to which a suitable magnetic bias is applied, to replace the magnetic modulator. In such a case the carrier wave, of a very high or so-called microwave frequency, may be passed through the body by conventional techniques, the biasing magnetic field is applied by way of a coil that surrounds the body, the signal is utilized to modulate the strength of the biasing field, and the output of the apparatus consists of modulation products. Obviously the self-inductance of the coil that carries the modulating signal current places restrictions on the frequency of the signal wave: i.e., it must be low compared with the carrier frequency. Hence the frequencies of such modulation products as may be included in the output of the apparatus are closely equal, on the relative scale, to the carrier frequency itself, and it is difficult to tune any one in and equally difficult to tune any other one out.

As a result, any negative resistance which may be reflected back into the signal wave source by virtue of flow of current at the lower side frequency is offset by positive resistance due to the flow of an equal amount of current at the upper side frequency and the apparatus, while operating satisfactorily as a modulator along conventional lines, can furnish no appreciable amount of gain.

It is therefore a specific object of the invention to extend the principles of the carrier-supported negative resistance amplifier to the very high, or so-called microwave frequency range.

The invention is predicated on (*a*) the realization that, for transfer of energy from a higher frequency to a lower one, it suffices to provide properly coordinated time variation of a suitable coupling element; (*b*) that such lower frequencies, and preferably the higher one as well, may advantageously be coordinated with corresponding oscillation modes in a resonant cavity which can be proportioned to support standing waves of the modes of interest simultaneously and to exclude oscillation modes of nearby, though different, frequencies; (*c*) that the highest frequency oscillation mode of interest may be furnished by the resonant precession of the magnetization of a body of a high resistivity ferrite material or the like, suitably biased for resonance at that frequency; and (*d*) that the required time varying intermode coupling may be provided by the interaction of the magnetic fields of the cavity modes through this same precession of magnetization, to which end the body is suitably disposed in the cavity in relation to such fields.

Accordingly, the invention is instrumented, in one of its forms, by the provision of a high frequency structure such as a chamber defining a cavity that is proportioned to be resonant in three modes having frequencies $f_p$, $f_1$ and $f_2$, of which the last two are preferably, though not necessarily, different, which satisfy the relation $$f_p = f_1 + f_2 \quad (1)$$

In this expression $f_1$ (or $f_2$) denotes the signal frequency, $f_p$ denotes the so-called "pump" frequency, higher than the signal frequency and $f_2$ (or $f_1$) denotes the difference between them; that is to say $$f_2 = f_p - f_1 \quad (2)$$

At a suitable point within this resonant cavity there is mounted a body of a ferromagnetic material which exhibits the gyromagnetic effect at microwave frequencies. A high resistivity manganese ferrite or an equivalent material such as yttrium iron garnet is suitable. This body is subjected to a steady magnetic field H in a preassigned direction and orientation with respect to the axes of the resonant cavity. The pumping signal, of a suitable very high frequency $f_p$, is introduced into the cavity through an aperture, orifice or probe which pierces the cavity wall at a certain point thereof such that standing waves of frequency $f_p$ are readily set up within the cavity in space patterns of which the magnetic field vectors $h_p$ cross the vector H of the steady field in the region where the ferromagnetic body is disposed. At the same time and by way, preferably, of another aperture, orifice or probe, a signal wave to be amplified, and of frequency $f_1$ (or $f_2$) is introduced into the resonant cavity in such a way that standing waves of this frequency, too, are readily set up within the cavity and in space patterns such that substantial components, at least, of their magnetic field vectors $h_1$ extend in directions parallel with the magnetic vector H of the steady field in that part of the cavity where the body is disposed.

Several such bodies may be employed, located at various points within the cavity where the spatial relations among the coacting fields obtain as described above.

Under these conditions the magnetization of the ferrite material tends to precess about an axis parallel with the direction of the steady bias field and at a rate that depends on the magnitude of this bias field: the magnitude H. This magnitude, and hence the rate of precession, can be adjusted within wide limits. When the magnitude of the bias field is such as to bring the precession rate to or close to the pumping frequency $f_p$, the gyromagnetic precession comes into resonance with the pumping field, and so reaches a large amplitude, to produce a substantial component of magnetization that lies in a plane perpendicular to the steady field H and oscillates in that plane at the frequency $f_p$. Taking, by way of example, the frequency of the signal wave to be amplified as $f_1$ and its magnetic field as $h_1$, the presence, within the body, of the signal frequency field $h_1$ acts to vary the frequency or the amplitude of this precession, and to do so at the frequency $f_1$. The gyromagnetic properties of the material of the ferrite body then cause a mixing of $h_1$ with $h_p$, to produce a radio frequency component $h_2$ of magnetic field having a frequency $f_p - f_1 = f_2$, namely the lower side frequency, and having a direction perpendicular to that of the steady field H. This new frequency is conveniently referred to as the "idler" frequency. In like manner, the idler frequency field $h_2$ produces a field at the frequency $f_p - f_2 = f_1$ and in a direction parallel to the steady field H and thus in additive relation to the original signal frequency field $h_1$.

Thus, a feedback system is realized that results in the presentation of a negative resistance to the signal frequency source. As in the case of the low frequency non-linear magnetic modulator, the system may become unstable and go into sustained self-oscillation if the pumping energy, of frequency $f_p$, is allowed to exceed a definable threshold. This restriction, however, is easy to meet and, below this threshold, the system is stable. Signal energy of frequency $f_1$, introduced in the fashion described above, is thus amplified and may be withdrawn at the same frequency in amplified form.

Substantial energy of the idler frequency $f_2$ is stored in the system. Hence, if frequency changing action is desired in addition to amplification, the amplified energy may be withdrawn at the idler frequency instead of at the signal frequency. Introduction and withdrawal may be effected by way of conventional apertures.

In a modified form of the invention, one or more of the ferromagnetic resonance modes of the coupling body may be turned to account to reinforce, or to replace, one or more of the oscillation modes of the resonant cavity. Thus, for any frequency of resonant precession and for any magnitude of the magnetic bias that produces it, the ferromagnetic body is normally capable of exhibiting internal ferromagnetic resonance at one of its many available resonance frequencies, in particular at the frequency $f_2$, and may be located so as to favor the coupling of the mode of the frequency, $f_p$, to one of the cavity oscillation modes, preferably that of the lower frequency $f_1$. In addition, several such bodies may be employed, located so as to suppress undesired couplings to the other modes. The frequency of resonance of the body, as well as the frequency of the precession of its magnetization, may be adjusted within wide limits by the application to it of a steady magnetic field of approximate strength and direction.

Whatever the form of the invention, in the special case in which the signal and idler frequencies are alike then, by virtue of Equation 1, each of them is a subharmonic of the pumping frequency. In other words, in this special case, $$f_p = f_1 + f_2 = 2f_1 \quad (3)$$

In every case, each of the ferromagnetic bodies is to be located within the resonant cavity at such a point, and the steady field H is to be so oriented, that three conditions of operation are met, namely:

(1) One of the two lower frequency fields ($h_1$ or $h_2$) has a magnetic component that is parallel to H;

(2) The other of the two lower frequency fields ($h_2$ or $h_1$) has a component that is perpendicular to H; and (3) The higher frequency field $h_p$ has a component that is perpendicular to H.

Whatever the form of the apparatus, signal energy to be amplified, and of frequency equal to or within a band centered on the frequency $f_1$ (or $f_2$) may be introduced into the cavity by way of a conventional coupling aperture. The negative resistance developed through the action on the ferrite of the pumping energy presents itself to this signal energy as a negative resistance and, as a result, the signal is amplified. It may be withdrawn at the same frequency in amplified form by way of an output coupling aperture which again may be conventional.

The invention provides, in addition, a frequency changing action so that the signal energy introduced at the frequency $f_1$ may, if desired, be withdrawn at the frequency $f_2$, or vice versa. Introduction and withdrawal may be carried out by way of conventional apertures.

Laboratory observations of certain anomalous ferromagnetic resonance phenomena in ferrites subjected to strong radio frequency fields have been reported in the scientific literature. These phenomena have been discussed and explained as extreme instances of subharmonic resonance, by H. Suhl in the Physical Review, for February 15, 1956, vol. 101, page 1437. This publication suggests the mechanism, internal to the ferrite, which is responsible for such subharmonic resonance and also for the coupling which it furnishes between oscillations in one mode at a frequency $f_0$ and pumping energy in another mode at a frequency $2f_0$. This internal coupling mechanism is further elaborated mathematically in a publication by H. Suhl entitled "The Nonlinear Behavior of Ferrites at High Micro-Wave Signal Levels" in the Proceedings of the Institute of Radio Engineers for October 1956, vol. 44 at page 1270.

It is a feature of the invention that it operates without benefit of any hot cathode or of the transport of charges through a semiconductor. Hence, sources of shot noise are absent; and the only noise introduced into the signal in the course of its amplification is so-called "Johnson" noise which is due to the fact that the circuit elements, and in particular the load, are at elevated temperatures as compared with the absolute zero of temperature. This one significant source of noise may be greatly reduced by refrigerating the amplifier. Better still, since the principal point of origin of such noise is the load, the latter alone may be refrigerated, being coupled into the amplifier circuit by way of a transformer.

The invention will be fully apprehended from the following detailed description of preferred embodiments thereof taken in connection with the appended drawings, in which.

Figure 1:
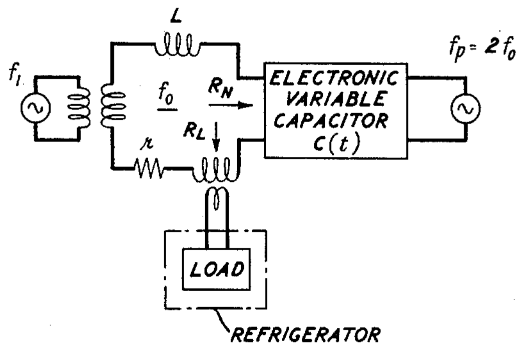
FIG. 1 is a schematic circuit diagram illustrating a low-frequency counterpart of the invention, having one degree of freedom.

Referring now to the drawings, FIGS. 1–4 are schematic diagrams of low frequency amplifiers of the reactance variation type, now termed "parametric" amplifiers. Of these, each of the first two comprises a single mesh circuit, resonant at the frequency $f_0$, and including a variable reactance element which is varied at the rate $f_p=2f_0$ by a pumping generator. Each of the third and fourth figures comprises a coupled circuit of two meshes proportioned to be resonant in two modes, of frequencies $f_1$ and $f_2$, respectively, and intercoupled by way of a common branch which includes a variable reactance element which is varied by a pumping generator at the rate $$f_p=f_1+f_2$$

Figure 2:
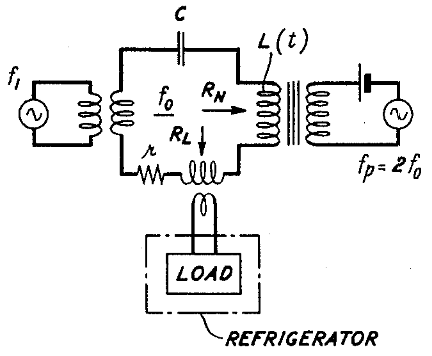
FIG. 2 is a schematic circuit diagram showing an alternative to the system of FIG. 1.
Figure 3:
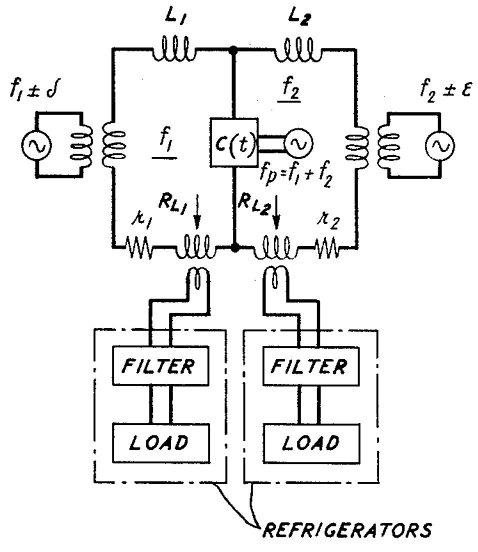
FIG. 3 is a schematic circuit diagram illustrating a low-frequency counterpart of the invention, having two degrees of freedom.
Figure 4:
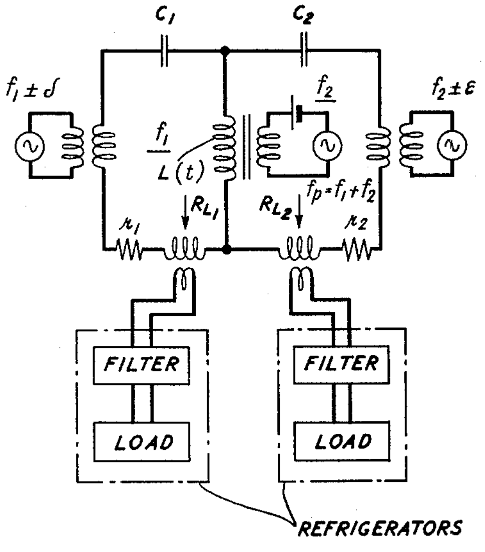
FIG. 4 is a schematic diagram showing an alternative to the system of FIG. 3.

In FIGS. 1 and 3 the variable reactance element is capacitive in character. In FIGS. 2 and 4 it is inductive. In each case signal energy within a band centered on the resonant frequency, of the only mesh in the cases of FIGS. 1 and 2 or of either mesh in the cases of FIGS. 3 and 4, is introduced by way of an input transformer and amplified energy is withdrawn into a load by way of an output transformer. The circuits of FIGS. 3 and 4 may, if desired, also operate as frequency changers, the signal to be amplified lying within the frequency band of one of the meshes and the withdrawn signal lying within the frequency band of the other. To reduce residual Johnson noise originating in the load, the load is shown, in each case, as being placed in a refrigerator.

Figure 5:
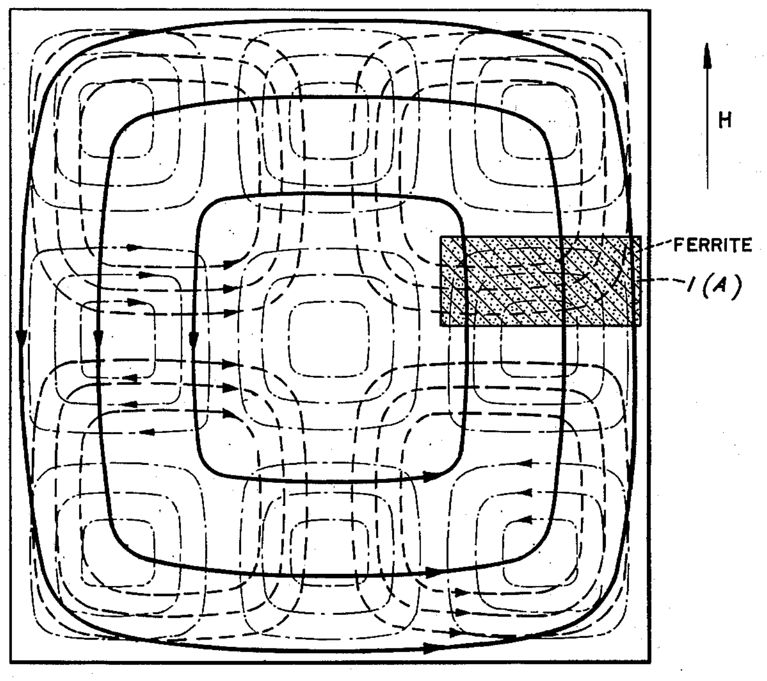
FIG. 5 is a cross-sectional diagram showing the configuration of the magnetic fields of three oscillation modes within an electromagnetic cavity resonator.

FIG. 5 is a cross-sectional diagram showing an electromagnetic resonator comprising a cavity in the form of a rectangular parallelepiped, having two sides of equal lengths, so that one face, in the plane of the paper, is square. It is proportioned to support resonant oscillations in three distinct modes having three different frequencies. The first of these, of the lowest frequency $f_1$, is characterized by magnetic lines of force forming a single set of concentric loops whose centers coincide with the center of that face of the resonator which lies parallel with the paper. They are shown in solid lines. The second comprises four groups of such loops, shown in the broken lines. Its frequency $f_2$ is twice that of the first mode. In accordance with the invention the frequency of the third mode $f_p$ is equal to the sum of the frequencies of the first two; e.g., $$f_p=f_1+f_2$$

The field configuration of this mode may comprise nine groups of loops in the plane of the paper. They are shown in "dot-dash" lines.

Figure 6:
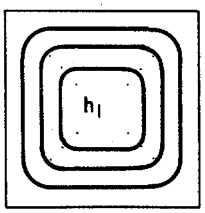
FIGS. 6, 7 and 8 are simplified diagrams showing the field configurations of oscillations of the first, second and third modes, individually.
Figure 7:
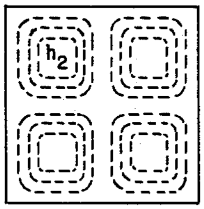
Figure 8:
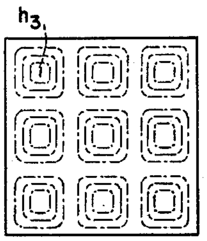

FIGS. 6, 7 and 8 show the configurations of the magnetic fields $h_1$, $h_2$, $h_3$ of the first, second and third modes, individually.

Figure 9:
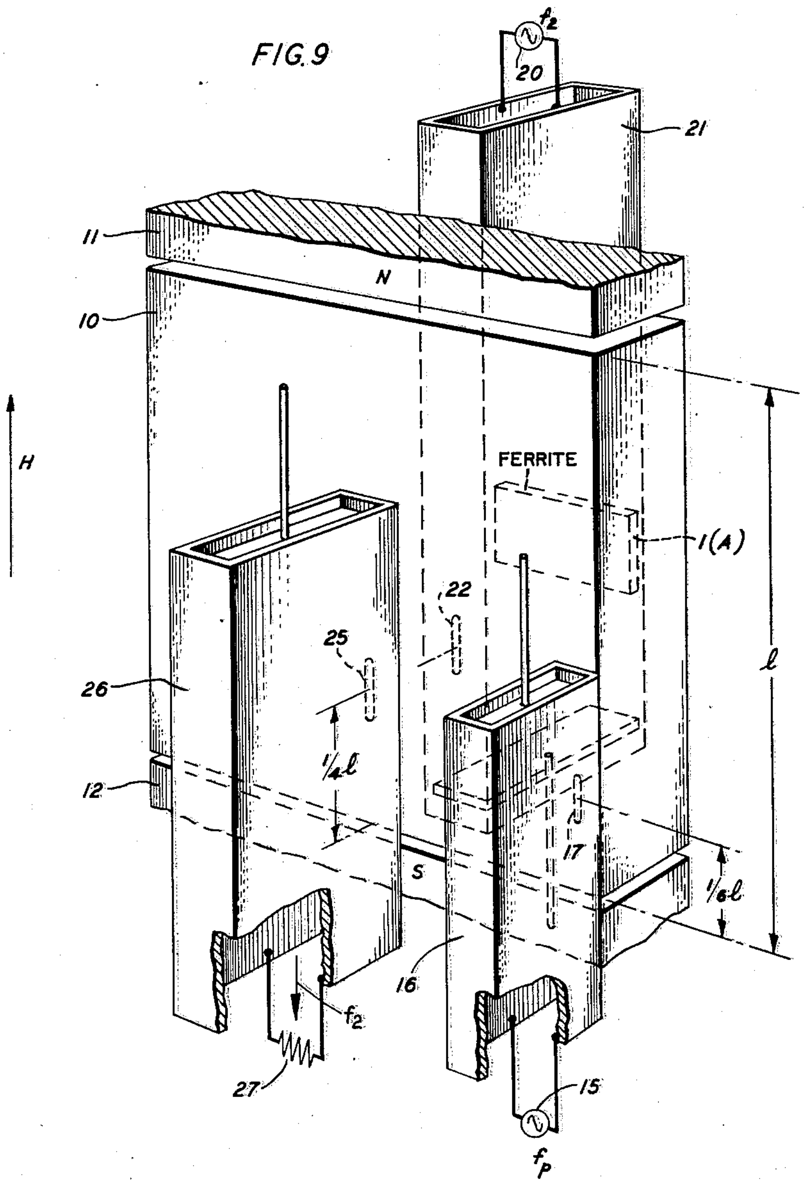
FIG. 9 is a perspective drawing, partly in section, showing an amplifier embodying the principles of the invention.

The diagram of FIG. 5 also shows a body 1 of ferromagnetic material designated "A" disposed within the cavity so as to interact with the magnetic fields to provide a coupling between the third mode and the first two modes. FIG. 9 shows a resonator 10 comprising a cavity which can support the fields of FIG. 5, containing an "A" body. The disposition of the body 1(A), both in relation to the radio frequency fields within the cavity 10 and with relation to a steady magnetic field H applied externally, must be such as to satisfy the three conditions enumerated above. These are minimum requirements. For optimum performance, however, the body 1(A) is, in addition, preferably located at a point where the magnectic field of one of the low frequency modes, e.g., $f_1$, is substantially vertical, the other low frequency mode, $f_2$, is substantially horizontal and, with an external field H in the vertical direction, the field of the high frequency mode, $f_p$, is largely horizontal. In other words, it is located at a point where a substantial number of lines of force of the mode of frequency $f_1$ cross a substantial number of lines of force of the mode of frequency $f_2$, and do so substantially at right angles. Thus the body 1(A) is disposed in the cavity 10 at a point, and over an area, where these conditions are met to the greatest possible extent, without at the same time embracing areas where they are not met.

For optimum performance, i.e., for strong coupling between modes, the total volume of the ferromagnetic material within the cavity 10 should be large; but if it were to cover a substantial fraction of the front face of the cavity it would embrace regions which do not satisfy the foregoing requirements but, instead, have other field configurations. This would make for destructive interference between fields in one part of the ferromagnetic body and oppositely directed fields in another part. The drawing shows a body that is so located and dimensioned that the fields within it are to a large extent similarly directed. Its height is approximately one-half of its width. To obtain, at the same time, a large total volume of ferromagnetic material, a number of similar bodies may be disposed at other parts of the cavity, each sufficiently separated from the others to prevent interaction of fields within the body.

The location of the body 1(A) along an axis perpendicular to the front face of the cavity, and its thickness in the same direction, are determined on the basis of compromise between the consideration of strong coupling, which calls for large volume, and the desirability of not distorting the fields within the cavity to an excessive extent, which calls for small volume. A suitable compromise is that the depth of the body shall be from one-tenth to one-half of the depth of the cavity. The body may be cemented to the front wall or to the rear wall of the cavity or it may be supported between these walls or struts of electromagnetically nonresponsive material.

A steady magnetic field, H, is applied, as by a magnet the ends 11, 12 of whose poles are indicated, in the direction shown in FIG. 9. Energy of frequency $f_p$, derived from a pumping generator 15 is applied through a waveguide 16 of well known construction and is introduced into the cavity 10 by way of a coupling aperture 17 of appropriate size and shape, and located at a maximum point of the magnetic field of the third, $f_p$, mode; e.g., one-sixth of the distance from bottom to top of the front face of the resonator 10, and close to a side wall. The dimensions of the coupling aperture and of the waveguide may appropriately be selected to provide a low-frequency cutoff below the frequency $f_p$ but above the frequencies $f_1$ and $f_2$.

When the amount of this pumping energy is short of the amount which makes for self-oscillation at the frequency $f_1$ or $f_2$ the ferrite body 1(A) subjected to the steady field H, and to the radio frequency field of the pumping source 15 manifests itself as a negative resistance from the standpoint of any signal, lying within a band centered on the frequency $f_1$ or $f_2$ which may be introduced into the cavity 10; and this effective negative resistance nearly offsets the positive resistances of the system including, particularly, the parasitic losses in the cavity walls and the load. Hence the apparatus behaves as an amplifier for a signal of either of these frequencies. Such a signal, within a band centered on the frequency $f_2$, originating in a signal source 20, is introduced through a second waveguide 21 and by way of a second coupling aperture 22 located in the rear wall of the resonator 10, while amplified energy is withdrawn by way of a third aperture 25 and waveguide 26 symmetrically located on the front wall of the cavity 10 for delivery to a load 27. Reference to FIG. 5 shows that the second aperture 22 and the third aperture 25 are located, oriented and dimensioned so as to discriminate against the fields of the first and third modes. Hence, substantially no energy of the first mode or of the third is either returned to the $f_2$ source or delivered to the $f_2$ load.

In FIG. 9, as in the other figures to follow, each of the waveguides 16, 21, 26 is terminated by a stub whose position, relatively to the coupling aperture, is movable to adjust the energy transfer from waveguide to cavity or vice versa.

Figure 10:
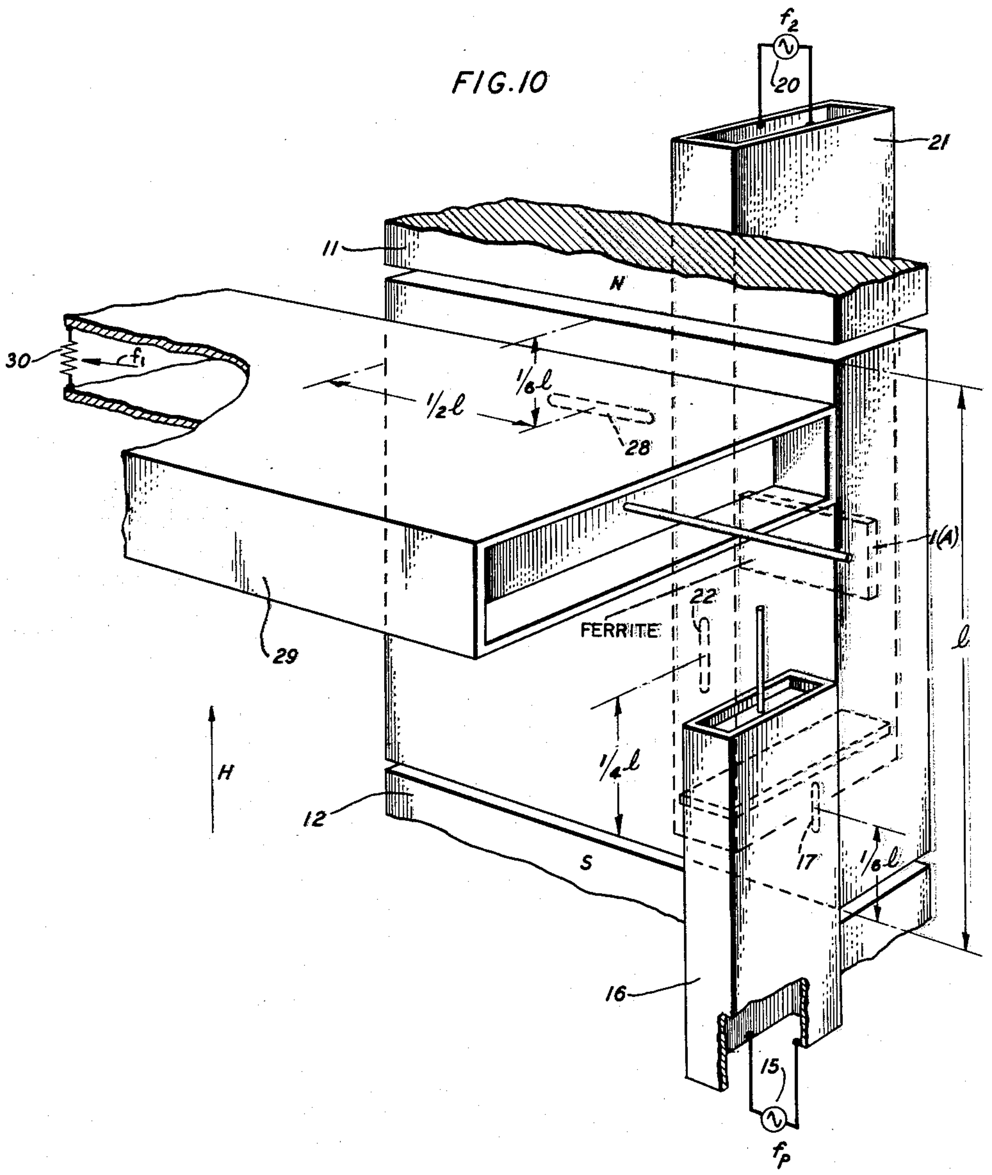
FIG. 10 is a perspective diagram, partly in section, showing a modification of the amplifier of FIG. 9 which operates as a frequency converter as well as an amplifier.

Because substantial energy of the first mode of frequency $f_1$ exists within the cavity, as well as energy of the second mode of the frequency $f_2$, the apparatus can readily carry out a frequency changing operation along with amplification. To utilize this feature it is only necessary to modify one or other of the second and third coupling apertures and their waveguides. Taking, by way of example, a situation in which it is desired to convert an incoming wave of high radio frequency to an outgoing wave of lower frequency, the incoming wave may have a frequency lying in the $f_2$ band and the outgoing wave may have a frequency lying in the $f_1$ band. FIG. 10 illustrates the simple change which may be made in the structure of the apparatus to accomplish this result. Here the pumping energy source 15, waveguide 16 and coupling aperture 17 and also the signal input source 20, waveguide 21 and coupling aperture 22 are the same as those in FIG. 9, while the output coupling aperture 28 and waveguide 29 are now proportioned and disposed to withdraw energy in the $f_1$ band for delivery to a load 30. The aperture 28 is therefore located at a point on the front face of the cavity 10 at which the energy of the mode of lowest frequency is a maximum and at a null of the third or pumping mode. The location and orientation of the coupling aperture 28 are such as to minimize coupling to the mode of intermediate frequency $f_2$. In addition, waveguide filters of a type well known in the art may, if desired, be employed to prevent transmission to the load of any energy of the second or third modes, of frequencies $f_2$ and $f_p$, respectively.

With appropriate adjustment of the strength of the magnetic field H the material of the ferrite body may itself exhibit a resonance at one of the three frequencies in question, for example at the frequency $f_p$, in which case the proportioning of the cavity proper in a fashion to support this resonance is unnecessary, though it may be helpful.

Figure 11:
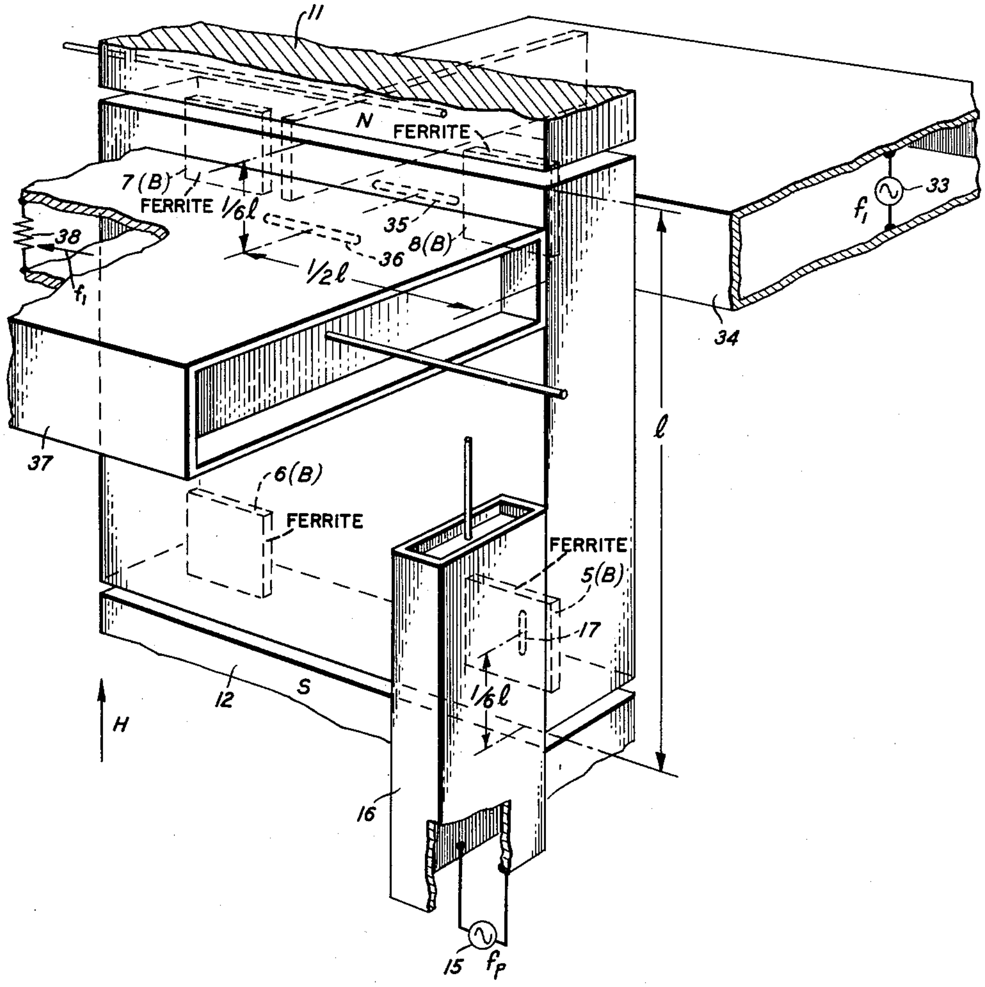
FIG. 11 is a perspective diagram, partly in section, showing an amplifier alternative to that of FIG. 9.

FIG. 11 is a perspective drawing, partly in section, showing an alternative to the amplifier of FIG. 9. The cavity 10 is proportioned for possible resonance in the same three modes discussed above. In this case the low frequency mode, represented by a single set of loops and of frequency $f_1$, and the high frequency mode represented by nine sets of loops and of frequency $f_p$, exist in fact while the mode of intermediate frequency $f_2$, represented by four sets of loops, does not in fact exist. The reason for this will be apparent from what follows. Energy of the pumping frequency source 15 is introduced by way of a waveguide 16 and an aperture 17 as described above in connection with FIG. 9. Amplified energy of the low frequency mode may be withdrawn by way of a coupling aperture 36 and a waveguide 37 for application to a load 38 as described in connection with FIG. 10. Energy to be amplified and of the lowest frequency $f_1$, originating in a signal source 33 and arriving by way of a waveguide 34 may be introduced by way of a coupling aperture 35 in the rear face of the cavity 10, located directly opposite the output coupling aperture 36 in the front face.

Referring to the field configuration diagram of FIG. 5, it will be observed that there exists, close to each corner of the front face of the cavity, a region in which the magnetic lines of the first and second modes extend parallel to each other, instead of crossing, as required by the first two conditions listed above. Hence, if a ferromagnetic body be located in one of these regions for inter-mode coupling, as indicated for the "B" bodies in FIG. 11, only one of these two modes can be established as a "cavity mode," while the other is not established. The one which is established depends on the frequency of the signal energy which is introduced.

The foregoing conditions of operation which are not met by the cavity fields are, however, in this case, met by the establishment, within a ferrite body which is properly located, of a ferromagnetic resonance field of appropriate orientation. Hence such a body 5(B) may be located in this region of the cavity 10. It may, for example, be a block of ferrite material whose horizontal and vertical dimensions are one-sixth of those of the cavity, with its center axis displaced to the left from the right-hand wall of the cavity by the same distance, one-sixth of the cavity width. It may be disposed close to the bottom wall of the cavity. As in the case of the earlier figures, its depth, normal to the plane of the drawing, may be from one-tenth to one-half the depth of the cavity and it may located as desired along this depth dimension.

Inasmuch as the waveform diagram of FIG. 5 is symmetrical, three other similar regions are found at the three remaining corners of the cavity, and hence three similar ferromagnetic "B" bodies, 6(B), 7(B) and 8(B), may be located in these corners. The wide spacing between them eliminates all possibility of destructive interference among them, and the symmetry of the arrangement tends, further, to suppress the $f_2$ mode. If desired, further measures for suppression of the $f_2$ mode can be taken.

The conditions of operation are satisfied by the establishment, within each of these ferromagnetic bodies, of a magnetic resonance field of which at least one significant component extends in the vertical direction. This field may be established by adjustment of the strength of an external field H, derived from a magnet the ends of whose poles are shown. The significant (vertical) component of this ferromagnetic resonance field thus lies parallel to the external field H and its lines of force, not shown, cross those of the low frequency mode, $f_1$, and of the high frequency cavity mode, $f_p$, approximately at right angles.

With this arrangement the apparatus of FIG. 11 operates as an amplifier for energy of frequency $f_1$. Such energy, derived from a signal source 33, may be introduced through a waveguide 34 and by way of an aperture 35 and it may be withdrawn in amplified form by way of another aperture 36 and a waveguide 37 for application to a load 38. The material of the ferromagnetic bodies "B," when subjected to the energy of the pumping frequency, establishes a coupling to each of the other two modes, one of which, $f_1$, is a cavity mode while the other, $f_2$, is a ferromagnetic resonance mode. Hence the resonant cavity, with the bodies thus located in it, appears to the signal frequency source 33 as a negative resistance which nearly offsets the positive resistances of the system including, particularly, the parasitic losses in the cavity walls and the load 38.

As in the cases of FIGS. 9 and 10 the coupling apertures 17, 35, 36, are preferably located at points of the resonator wall in a fashion to introduce or withdraw energy of a desired mode to the exclusion of energy of an undesired mode. The arrangement of FIG. 11 is particularly suitable from this standpoint because of the fact that oscillations of only two modes, $f_1$ and $f_p$, are sustained as cavity modes, the remaining mode, $f_2$, being restricted within the volume of the ferromagnetic bodies "B," and small regions in the immediate neighborhood of these bodies. Thus the pumping energy may be introduced at a point such that, referring to FIG. 5, the energy of the third mode is a maximum and the waveguide 16 and the coupling aperture 17 by way of which it is introduced may readily be so proportioned that the frequency of the first mode lies well below its cutoff. Hence no energy of the first mode can be returned to the pumping generator 15. The input signal aperture 35 by way of which signal energy is introduced into the cavity to establish the field of the first mode, and likewise the output coupling aperture 36 by way of which it is withdrawn, may be located at points of the cavity walls where the first mode energy is maximum and at nulls of the third mode. Thus, substantially no third mode energy is available at either of these signal coupling apertures to pass through them.

The bandwidth of an amplifier constructed and operated in accordance with the foregoing principles can readily attain a magnitude of several percent of the signal frequency, without undue sacrifice of gain. This compares favorably with the bandwidths of conventional radio broadcast amplifiers, klystron amplifiers and the like. Hence a signal whose frequency lies within this band is amplified in substantially the same fashion as is one whose frequency is exactly equal to the resonant frequency of the mesh into which it is introduced, even though it may differ slightly from such resonant frequency.

The apparatus of the invention operates as a signal amplifier when, as described above, the pumping energy is restricted to an amount short of a threshold of instability. When, to the contrary, this threshold is exceeded, the same apparatus breaks into self-oscillation at the two lower frequency modes $f_1$ and $f_2$. In such case, the input signal source may be removed, the input signal aperture may be closed, and the apparatus operates as a generator of energy at frequencies $f_1$ or $f_2$. Energy of the desired frequency may be withdrawn by way of an aperture and a waveguide for application to a load in precisely the fashion described above for the withdrawal of amplified signal energy. Location and orientation of the apertures in relation to the cavity and proportioning of the output waveguides in the fashion shown in FIGS. 9, 10 and 11 permits selection of energy of the desired mode and discrimination against energy of the undesired mode.

Many alternative structures are possible which embody the principles of the invention, and in which cavity oscillation modes alone, cavity oscillation modes and ferromagnetic resonance modes acting together, or ferromagnetic resonance modes alone are turned to account either for the amplification of signals or for the generation of oscillations.

What is claimed is:

1. A microwave signal amplifier which comprises electromagnetically resonant means for supporting standing wave oscillations of first, second, and third distinct modes and of frequencies $$f_1,\ f_2, \text{ and } f_p=f_1+f_2$$

with the microwave magnetic field of the third ($f_p$) mode oscillation having, in a common region, a substantial component in a first direction, and the microwave magnetic fields of the first and second mode oscillations having, in said common region, substantial components in said first direction and in a second direction, perpendicular to said first direction, respectively, a body of a ferromagnetic material which exhibits the gyromagnetic effect at microwave frequencies disposed in said region, means for establishing within said body a steady magnetic field in said second direction and of a strength to polarize said body to gyromagnetic resonance at said frequency $f_p$, means for pumping into said wave-supporting means energy of frequency $f_p$ in an amount short of a self-oscillation threshold, thereby to establish within said wave-supporting means a magnetic field of said pump oscillation mode and of pump frequency $f_p$ and to promote precession of the magnetization of said body about the axis of said steady field at said pump frequency, means for introducing into said wave-supporting means a signal of one of the frequencies $f_1$, $f_2$, thereby to establish within said wave-supporting means a magnetic field of signal oscillation mode and of signal frequency, the precession of the magnetization of said body operating, by abstraction of energy from the pump oscillation field, to increase the energy of said signal oscillation field and to establish within said wave-supporting means a magnetic field of an idler oscillation mode and of the other of said frequencies $f_1$, $f_2$, and means maximally coupled to the magnetic field of said signal oscillation mode and substantially decoupled from the fields of the pump oscillation mode and the idler oscillation mode for selectively withdrawing signal frequency energy enhanced in substantial proportion to the energy of the introduced signal.

2. Apparatus as defined in claim 1 wherein said wave-supporitng means comprises an electromagnetic resonator including a resonant cavity.

3. Apparatus as defined in claim 2 wherein two opposite faces of said resonator are square, whereby said first mode comprises one concentric set of magnetic field loops, said second mode comprises four sets of concentric field loops and the said third mode comprises nine sets of concentric magnetic field loops and whereby said frequencies are substantially in the ratios $$f_2=2f_1$$
$$f_p=3f_1$$

4. Apparatus as defined in claim 2 wherein said energy-withdrawing means comprises an aperture piercing a wall of said resonator at a point thereof where the magnetic field of said introduced frequency mode is a maximum and the magnetic fields of said pump and idler modes are minimal, said aperture being oriented in a direction to prevent withdrawal of energy of frequencies other than said introduced frequency.

5. Apparatus as defined in claim 1 wherein said body embraces a region of said wave-supporting means where conditions for said increase and establishment are maximally met without embracing regions where they are not met.

References Cited in the file of this patent

UNITED STATES PATENTS

| | | |
|---|---|---|
| 1,206,643 | Alexanderson | Nov. 28, 1916 |
| 1,884,844 | Peterson | Oct. 25, 1932 |
| 1,884,845 | Peterson | Oct. 25, 1932 |
| 2,806,138 | Hopper | Sept. 10, 1957 |
| 2,815,488 | Von Neumann | Dec. 3, 1957 |
| 2,825,765 | Marie | Mar. 4, 1958 |
| 2,883,481 | Tien | Apr. 21, 1959 |
| 2,978,649 | Weiss | Apr. 4, 1961 |

FOREIGN PATENTS

| | | |
|---|---|---|
| 980,648 | France | May 16, 1951 |
| 1,079,880 | France | May 26, 1954 |
| 64,770 | France | June 29, 1955 |

(Patent of Addition to Pat. 1,079,880)

OTHER REFERENCES

RCA Review Sept. 1949, vol. 10, No. 3, pages 387–396.

Chang et al.: "Proceedings of the IRE," July 1958, pages 1383–1386.

Ayers et al.: "Journal of Applied Physics," February 1956, pages 188–189.

Manley et al.: "Proceedings of the IRE," July 1956, pages 904–913.

Gotto: "Proceedings of the IRE," August 1959, pages 1304–1316.

Darrow: "Bell System Technical Journal," vol. 32, Nos. 1 and 2, January and March 1953, pages 74–99 and 384–405.

"Spectroscopy at Radio and Microwave Frequencies" (D.J.E. Ingram) published by Butterworths Scientific Publications (London), 1955 (page 215 relied on).

Mumford: "Proceedings of the IRE," May 1960, pages 848–853.

Poole et al.: "IRE Wescon Convention Record 1957, Part 3" pages 170–174.

"Quantum Electronics," edited by Townes, Columbia, University Press, 1960, article by Fox on pages 306–313.

Damon et al.: "IRE Transactions on Microwave Theory and Techniques," January 1960, pages 4–9.

Suhl: "Proposal for Ferromagnetic Amplifier in the Microwave Range, Physical Review, April 15, 1957, pages 384–385.